(12) United States Patent
Rakshit

(10) Patent No.: US 12,001,882 B2
(45) Date of Patent: Jun. 4, 2024

(54) MACHINE LOGIC FOR JOB MANAGEMENT BASED ON CONTEXTUAL FACTORS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 17/347,619

(22) Filed: Jun. 15, 2021

(65) Prior Publication Data
US 2022/0398131 A1    Dec. 15, 2022

(51) Int. Cl.
G06F 9/48 (2006.01)
G06F 9/455 (2018.01)
G06N 20/00 (2019.01)

(52) U.S. Cl.
CPC ........ *G06F 9/4881* (2013.01); *G06F 9/45533* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,782,189 B2 * | 7/2014 | Akiyama | H04L 12/1446 709/224 |
| 9,086,929 B2 | 7/2015 | Bailey | |
| 11,372,689 B1 * | 6/2022 | Allen | G06F 9/4887 |
| 2007/0039003 A1 * | 2/2007 | Meguro | G06F 9/5005 718/103 |
| 2009/0100431 A1 | 4/2009 | Doyle | |
| 2011/0066456 A1 | 3/2011 | Lu | |
| 2012/0016833 A1 | 1/2012 | Janiesch | |
| 2013/0006701 A1 | 1/2013 | Guven | |
| 2013/0080641 A1 | 3/2013 | Lui | |
| 2013/0167185 A1 | 6/2013 | Lee | |
| 2019/0034242 A1 | 1/2019 | Nutter | |
| 2020/0007511 A1 * | 1/2020 | Van de Groenendaal | H04L 63/0428 |
| 2020/0374974 A1 * | 11/2020 | Sun | H04L 41/20 |
| 2022/0309413 A1 * | 9/2022 | Ramachandran | H04M 3/5133 |

OTHER PUBLICATIONS

Boloor et al., "Dynamic request allocation and scheduling for context aware applications subject to a percentile response time SLA in a distributed cloud", NC State University, Cloudcom 2010, Indianapolis, Indiana, USA, 20 pages.
Labidi et al., "Ontology-Based Context-Aware SLA Management for Cloud Computing", MEDI 2014, LNCS 8748, pp. 193-208, 2014, © Springer International Publishing Switzerland 2014.

(Continued)

*Primary Examiner* — Chat C Do
*Assistant Examiner* — William C Wood
(74) *Attorney, Agent, or Firm* — Stosch Sabo

(57) ABSTRACT

Technology for revising a smart contract, including a set of machine logic based rules for job management of jobs to be performed under an SLA (service level agreement). The machine learning algorithm is refined and optimized dynamically based on intermittently received context data (historical, relevant operational data—may be augmented with projections regarding future events and/or operations). Also, the SLA is self-evolving so that its terms also change based an analysis of the context data.

9 Claims, 5 Drawing Sheets

(56) References Cited

OTHER PUBLICATIONS

Labidi et al., "Toward Context-Aware SLA for Cloud Computing", Copyright Springer International Publishing AG 2017, A. Abraham et al. (eds.), Proceedings of the 16th International Conference on Hybrid Intelligent Systems (HIS 2016), Advances in Intelligent Systems and Computing 552, DOI 10.1007/978-3-319-52941-7 35, 11 pages.

* cited by examiner

400

DEAR COMPUTING SERVICES CUSTOMER:

ATTACHED ARE SOME PROPOSED CHANGES TO YOUR SLA WITH THE COMPUTING SERVICES PROVIDER ENTITY. THESE CHANGES ARE INCORPORATED INTO "SECOND SLA" (COPY ATTACHED). THE CURRENTLY OPERATIVE "FIRST SLA" IS ALSO ATTACHED FOR YOUR CONVENIENCE OF REVIEW. LET US KNOW WHAT YOU THINK.

| FIRST SLA 302 | SECOND SLA 318 |

FIG. 4

MACHINE LOGIC FOR JOB MANAGEMENT BASED ON CONTEXTUAL FACTORS

BACKGROUND

The present invention relates generally to the field of "job management" (see definition, below) for "computing jobs" performed by computers.

The Wikipedia entry for "job (computing)" (as of 28 Apr. 2021) states in part as follows: "In computing, a job is a unit of work or unit of execution (that performs said work). A component of a job (as a unit of work) is called a task or a step (if sequential, as in a job stream). As a unit of execution, a job may be concretely identified with a single process, which may in turn have subprocesses (child processes; the process corresponding to the job being the parent process) which perform the tasks or steps that comprise the work of the job; or with a process group; or with an abstract reference to a process or process group, as in Unix job control . . . . Jobs can be started interactively, such as from a command line, or scheduled for non-interactive execution by a job scheduler, and then controlled via automatic or manual job control. Jobs that have finite input can complete, successfully or unsuccessfully, or fail to complete and eventually be terminated. By contrast, online processing such as by servers has open-ended input (they service requests as long as they run), and thus never complete, only stopping when terminated (sometimes called "canceled"): a server's job is never done."

The Wikipedia entry for "job control (computing)" (as of 28 Apr. 2021, sometimes herein referred to by the synonymous term "job management") states in part as follows: "In computing job control refers to the control of multiple tasks or jobs on a computer system, ensuring that they each have access to adequate resources to perform correctly, that competition for limited resources does not cause a deadlock where two or more jobs are unable to complete, resolving such situations where they do occur, and terminating jobs that, for any reason, are not performing as expected. Job control has developed from the early days of computers where human operators were responsible for setting up, monitoring and controlling every job, to modern operating systems, which take on the bulk of the work of job control. Even with a highly sophisticated scheduling system, some human intervention is desirable. Modern systems permit their users to stop and resume jobs, to execute them in the foreground (with the ability to interact with the user) or in the background. Unix-like systems follow this pattern . . . . This system of pre-emptive multitasking forms the basis of most modern job control systems . . . . Pre-emptive multitasking with job control assures that a system operates in a timely manner most of the time. In some environments (for instance, operating expensive or dangerous machinery), a strong design constraint of the system is the delivery of timely results in all circumstances. In such circumstances, job control is more complex, and the role of scheduling is more important."

The Wikipedia entry for "service level agreement" (as of 28 Apr. 2021) states in part as follows: "A service-level agreement (SLA) is a commitment between a service provider and a client. Particular aspects of the service—quality, availability, responsibilities—are agreed between the service provider and the service user. The most common component of an SLA is that the services should be provided to the customer as agreed upon in the contract. As an example, Internet service providers and telcos will commonly include service level agreements within the terms of their contracts with customers to define the level(s) of service being sold in plain language terms. In this case the SLA will typically have a technical definition in mean time between failures (MTBF), mean time to repair or mean time to recovery (MTTR); identifying which party is responsible for reporting faults or paying fees; responsibility for various data rates; throughput; jitter; or similar measurable details . . . . Operational-level agreements or OLAs, however, may be used by internal groups to support SLAs. If some aspect of a service has not been agreed with the customer, it is not an 'SLA.' . . . SLAs commonly include many components, from a definition of services to the termination of agreement. To ensure that SLAs are consistently met, these agreements are often designed with specific lines of demarcation and the parties involved are required to meet regularly to create an open forum for communication. Rewards and penalties applying to the provider are often specified. Most SLAs also leave room for periodic (annual) revisitation to make changes . . . . Service-level agreements can contain numerous service-performance metrics with corresponding service-level objectives. A common case in IT-service management is a call center or service desk. Metrics commonly agreed to in these cases include: Abandonment Rate: Percentage of calls abandoned while waiting to be answered. ASA (Average Speed to Answer): Average time (usually in seconds) it takes for a call to be answered by the service desk. TSF (Time Service Factor): Percentage of calls answered within a definite timeframe, e.g., 80% in 20 seconds. FCR (First-Call Resolution): A metric that measures a contact center's ability for its agents to resolve a customer's inquiry or problem on the first call or contact. TAT (Turn-Around Time): Time taken to complete a certain task. TRT (total resolution time): Total time taken to complete a certain task. MTTR (Mean Time To Recover): Time taken to recover after an outage of service. Uptime is also a common metric, often used for data services such as shared hosting, virtual private servers and dedicated servers. Common agreements include percentage of network uptime, power uptime, number of scheduled maintenance windows, etc."

SUMMARY

According to an aspect of the present invention, there is a method, computer program product and/or system that performs the following operations (not necessarily in the following order): (i) receiving a first version of a smart contract designed for use with a first SLA (service level agreement), the first version of the smart contract including a plurality of machine logic based computing job control rules for performing job management in a computing environment governed by the first SLA, with the plurality of machine logic based computing job control rules including a first job control rule; (ii) receiving a set of context data, with the context data including historical information relevant to job management under the first SLA; (iii) training a machine learning algorithm using the set of context data as training data; and (iv) applying the machine learning algorithm to the first version of the smart contract, with the application of the machine learning algorithm making at least a first change to the first job control rule and to thereby obtain a second version of the smart contract.

BRIEF DESCRIPTION OF THE DRAWINGS

FIG. 4 is a screenshot view generated by the first embodiment system; and

DETAILED DESCRIPTION

Figure 1:
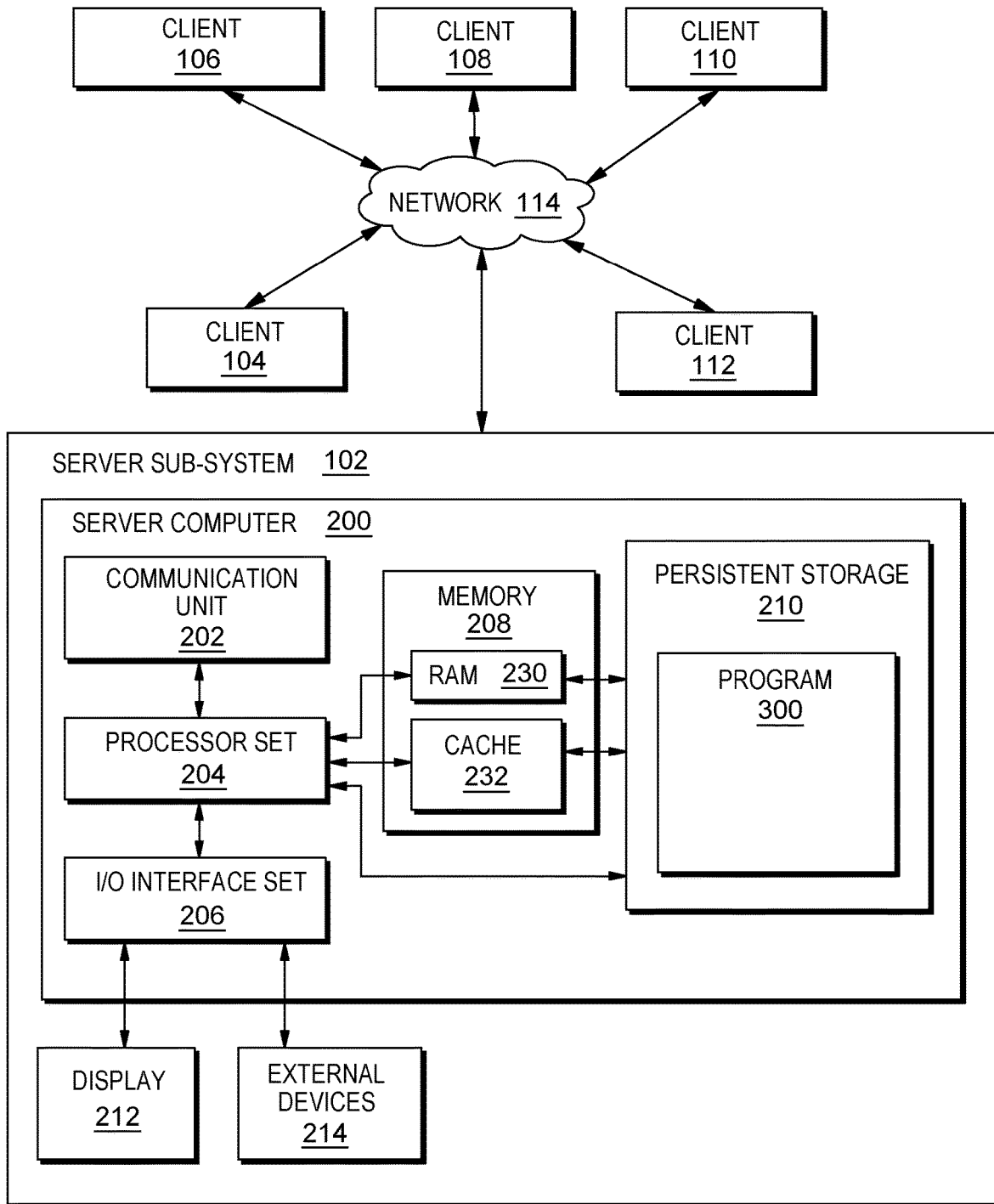
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
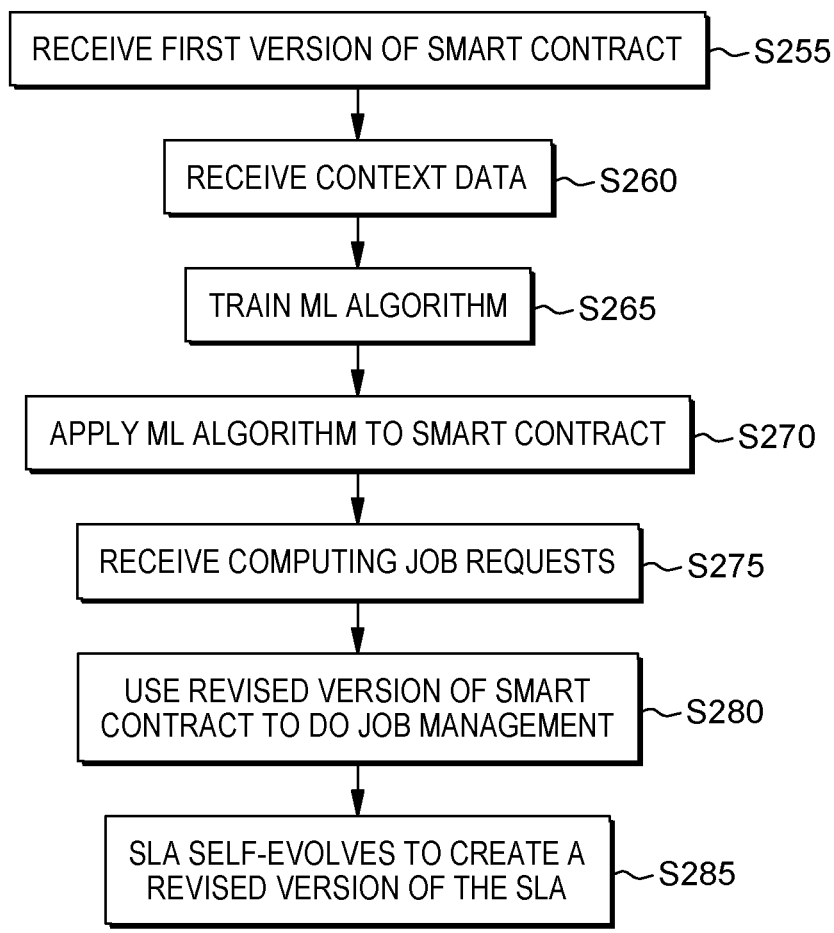
FIG. 2 is a flowchart showing a first embodiment method performed, at least in part, by the first embodiment system.
Figure 3:
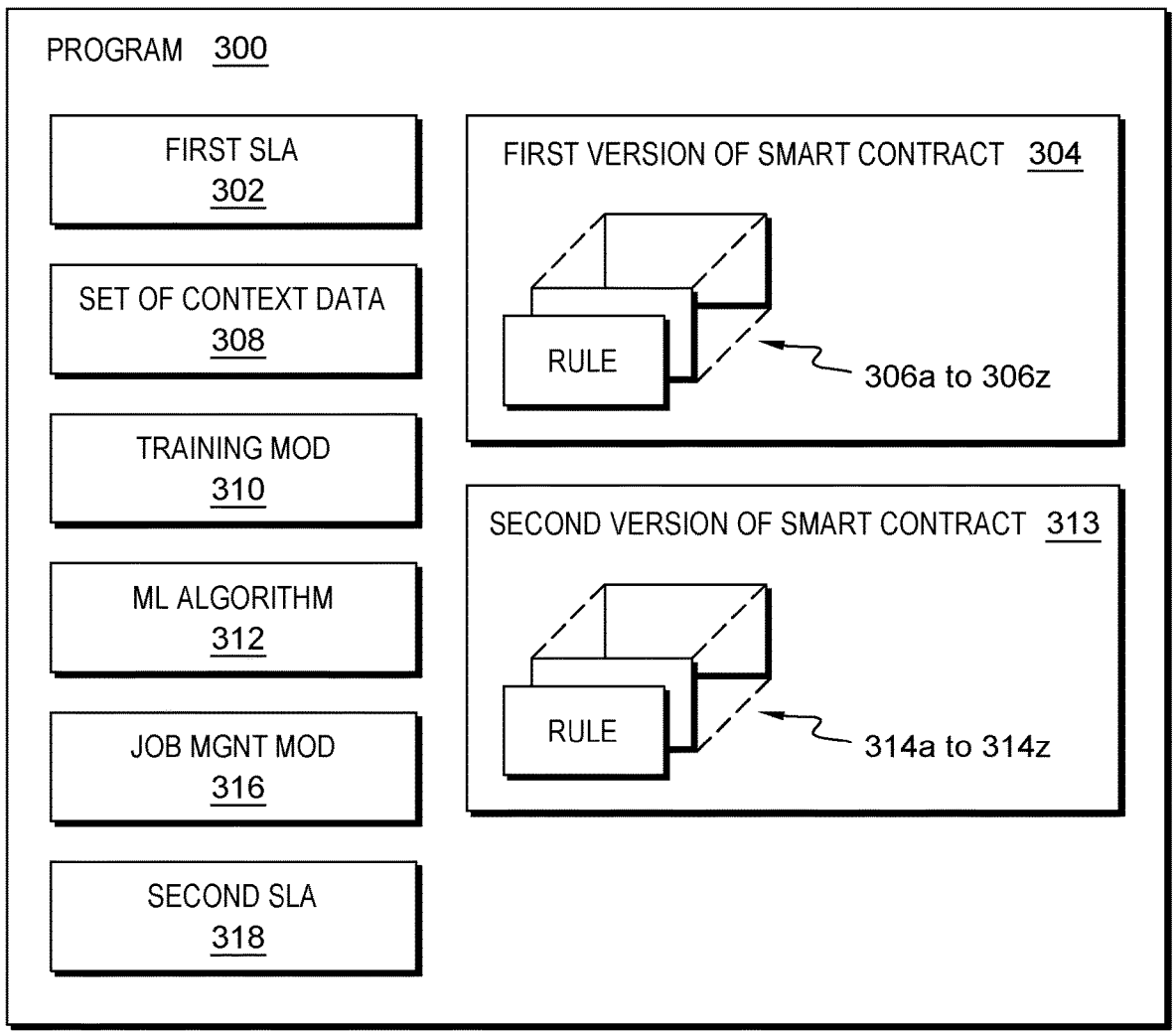
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where a first version of a smart contract 304 is received. The smart contract is designed for use with a first SLA (service level agreement) 302. The first version of the smart contract includes machine logic based computing job control rules 306a to 306z for performing job management in a computing environment governed by the first SLA. The example of flow chart 250, to be discussed in the following paragraphs, will focus on a revision that is made to rule 306a. In many embodiments, revisions might be made to many rules at once, and revisions may include discarding certain rule(s) into the smart contract or adopting certain new rule(s) into the smart contract. In many embodiments, the operations of flow chart 250 may be performed on an intermittent basis so that the smart contract is continually refined and improved over time and real world usage.

Processing proceeds to operation S260, where set of context data 308 is received from client sub-systems 104, 106, 108 through network 114. Context data 308 includes historical information relevant to job management under the first SLA. In this example, the context data includes at least one of the following types of context data: media report information, social media site information, government policy information, government law/rule information, published report information, future business projection related information, email analysis information, business analysis information, technological analysis information, minutes from meetings and/or employee/customer/client feedback information.

Processing proceeds to operation S265, where training module ("mod") 310 trains machine learning (ML) algorithm 312 using context data 308 as training data.

Processing proceeds to operation S270, where ML algorithm 312 is applied to the first version of the smart contract. The application of ML algorithm 312 makes a first change to job control rule 306a and to thereby obtain a second version of the smart contract 313 including the revised set of rules 314a to 314z. In this simple example, only rule 306a changes in its substance (to rule 314a) when saved as part of the second version of the smart contract—rules 306b to 306z don't change, in this example, when they are incorporated into the second version of the smart contract as respectively corresponding rules 314b to 314z. In this example, the change to job control rule 306a, 314a affects at least one of the following aspects of job management: application priority, the number of physical machines to be assigned to a given job, the specifications for physical machines to be assigned to a given job, the number of virtual machines, the number of virtual machines to be assigned to a given job, the specifications for virtual machines to be assigned to a given job, the number of containers to be assigned to a given job, and/or the specifications for containers to be assigned to a given job.

Processing proceeds to operation S275, where job management mod 316 receives requests for performance of computing jobs that are to be performed under the terms of the first SLA.

Processing proceeds to operation S280, where mod 316 uses the second version of the smart contract, including rules 314a to 314z, to perform job management while performing the requested computing jobs. In this example, the computing jobs are performed on client sub-systems 110, 112.

Processing proceeds to operation S285, where a self-evolving operation is performed on the first SLA, based, at least in part, on the context data. This self-evolving operation generates second SLA 318 from first SLA 302. Further information about self-evolving operations may be provided in the following sub-section of this Detailed Description section. In this example, the performance of the self-evolving operation changes a first agreement term, as between the first SLA and the second SLA, with the first agreement term relating to at least one of the following SLA aspects: quality metric(s), availability metric(s), responsibilities and/or service definitions. This self-evolving operation includes analysis of the usage behavior of the business users, priority of the applications, various external and internal influencing factors and correlating the same with usage behavior, priority of the applications, to identify what should be the logic of addressing the job processing priority, and recommends what changes are to be applied in the smart contract rule to control the Job and dynamic SLA based on context. So, the self-evolving will be identifying what correction/modification amendments are to be applied with the existing smart contract rule. Then the involved parties can analyze and approve, and accordingly the job scheduling will be modified. For Application Maintenance, support, job processing etc. are having SLA involved, and missing SLA is also associated with penalty, if dynamic SLA is to be maintained, then this should be addressed through a smart contract rule, so that correct financial impact(s) can be identified. Invention will identify what should be the correct/appropriate job processing rule among multiple applications based on change in contextual situation, and will be recommending the changes—this is shown in screenshot 400 of FIG. 4. Upon all involved parties acceptance of the recommendation, the smart contact rule will be updated to control the jobs.

III. FURTHER COMMENTS AND/OR EMBODIMENTS

Some embodiments of the present invention recognize the following facts, potential problems and/or potential areas for improvement with respect to the current state of the art: (i) the priority of an application can be changed from time to time based on the change in the contextual situation; (ii) there needs to be a way to ensure the data is available with the priority applications on a timely fashion; and/or (iii) if the jobs are not process aligned with the change in the contextual situation, then business users will not be getting data in a timely fashion from the priority application.

Some embodiments of the present invention may include one, or more, of the following operations, features, characteristics and/or advantages: (i) creates job processing rules in different contextual situations based on historical learning; (ii) creates a dynamic SLA (service-level agreement) rule; (iii) includes a self-evolving SLA based on historical learning; (iv) identifies dynamic frequency of processing a job; (v) includes the dynamically prioritization of jobs: (vi) includes selection of an appropriate data set for the job; (vii) creates dynamic workflow among the jobs based on change in the contextual situation; (viii) includes a context-aware system for the SLA in order to guarantee the QoS (quality of service); and/or (ix) does not include resource allocation.

Some embodiments of the present invention may include one, or more, of the following operations, features, characteristics and/or advantages: (i) performs at the job level; (ii) analyzes external and internal influencing factors; (iii) analyzes the usage pattern and predicts which application will have the priority; and/or (iv) based on historical learning, determines which job should get the priority to ensure the SLA is aligned with the change in the external and internal influencing factors.

Some embodiments of the present invention may include one, or more, of the following operations, features, characteristics and/or advantages: (i) determines the external and internal influencing factors to predict which application/job should get the priority and dynamically re-plan the job execution; and/or (ii) uses smart contract rule, customer dynamic need, and external and internal influencing factors to control the SLA, and align the same to identify if the application service provider has maintained the required contract with respect to any change in external and internal influencing factor.

Some embodiments of the present invention may include one, or more, of the following operations, features, characteristics and/or advantages: (i) the priority of the application can be changed from time to time, based on the change in the contextual situation, to ensure the data is available with the priority applications on a timely fashion (that is, if jobs are not processed and aligned with the change in the contextual situation, then business users will not be getting data in a timely fashion from the priority application); and/or (ii) focuses on analyzing various external and internal influencing factors which control any application support contract and ensures the SLA.

Some embodiments of the present invention may include one, or more, of the following operations, features, characteristics and/or advantages: (i) creates a job processing rule in different contextual situations based on historical learning; (ii) creates a dynamic SLA rule; (iii) includes a self-evolving SLA based on historical learning; (iv) identifies the dynamic frequency of processing a job; (v) includes dynamic prioritization of the job; (vi) includes selection of the appropriate data set for the job; and/or (vii) creates a dynamic workflow within the job based on change in the contextual situation.

Some embodiments of the present invention may include one, or more, of the following operations, features, characteristics and/or advantages: (i) proposes a method and system by which a change in a contextual situation will be validated by a smart contract rule; and/or (ii) due to changes in the contextual situation, jobs of the applications will dynamically be reprioritized so that the change in priority of the applications will be made available to the users.

Some embodiments of the present invention recognize the following facts, potential problems and/or potential areas for improvement with respect to the current state of the art: (i) in any application landscape there can be different types of applications; (ii) each of the applications have dedicated jobs to process data; (iii) jobs are processed based on schedule or satisfying one or more events; (iv) jobs are processed in any workflow, and data moves from one application to another application; and/or (v) while processing the jobs, the data is extracted, transformed and loaded.

Some embodiments of the present invention recognize the following facts, potential problems and/or potential areas for improvement with respect to the current state of the art: (i) the priority of application can be changed from time to time, based on change in the contextual situation, to ensure the data is available with the priority applications on a timely fashion; (ii) if the jobs are not process aligned with change in the contextual situation, then business users will not be getting data in a timely fashion from the priority application; and/or (iii) what is needed is a method and system by which jobs of different applications will dynamically be executed, based on the predicted change in the priority of the jobs.

Some embodiments of the present invention may include one, or more, of the following operations, features, characteristics and/or advantages: (i) using historical learning about the interaction of business users with different applications aligned with change in the contextual situations, the system will learn the context aware priority score of different applications, and accordingly the same will be used for creating self-evolving smart contract rules for application job reprioritization (for example, during a change in the contextual situation, the environmental parameters related to applications becomes a priority, so the smart contract rule will be auto-updated and will be ensuring the environmental related applications are available in a timely fashion and will be changing the priority); and/or (ii) the system will be executing the jobs based on the self-evolved smart contract rule so that priority applications, based on change in contextual, is ready for business users to analyze (for example, the smart contract rule will be auto-evolved based on the predicted change in the contextual situation, and will be controlling the jobs based on the smart contract rule).

Some embodiments of the present invention may include one, or more, of the following operations, features, characteristics and/or advantages: (i) the self-evolved smart contract rule will historically learn the workflow among the applications, and accordingly based on predicted requirement timing of any target application, will dynamically reschedule the jobs of the other applications in the workflow so that the target application is available in due time (for example, historically the system will be identifying the workflow among the applications, and accordingly based on the workflow, the jobs will be rescheduled so that the priority application will be available on time, and the application priority can be changed from time to time); and/or (ii) using historical learning, the system will predict the interval of job scheduling for any change in the contextual situation, and accordingly, the smart contract will be updated and will control the jobs as per the predicted situation (for example, because of any change in the contextual situation, one job is to be processed with a higher number of frequencies, the system will be controlling the jobs based on the self-evolved smart contract rule).

Some embodiments of the present invention may include one, or more, of the following operations, features, characteristics and/or advantages: (i) based on historical learning about the usage of various business data, the system will be predicting what filter is to be applied in the data so that a subset of the data can be processed and can make the application available with the appropriate filter (for example, in a particular contextual situation, only one environmental parameter is to be considered (for example, only air pollution) so the job will dynamically be filtering the data so that the application is made available in a timely fashion); and/or (ii) the service level agreement (SLA) will dynamically be aligned with the self-evolved smart contract rule, so that the support of the application can be done based on the dynamically created service level agreement (for example, the service level agreement of the applications will be controlled with a dynamically created smart contract rule).

Figure 5:
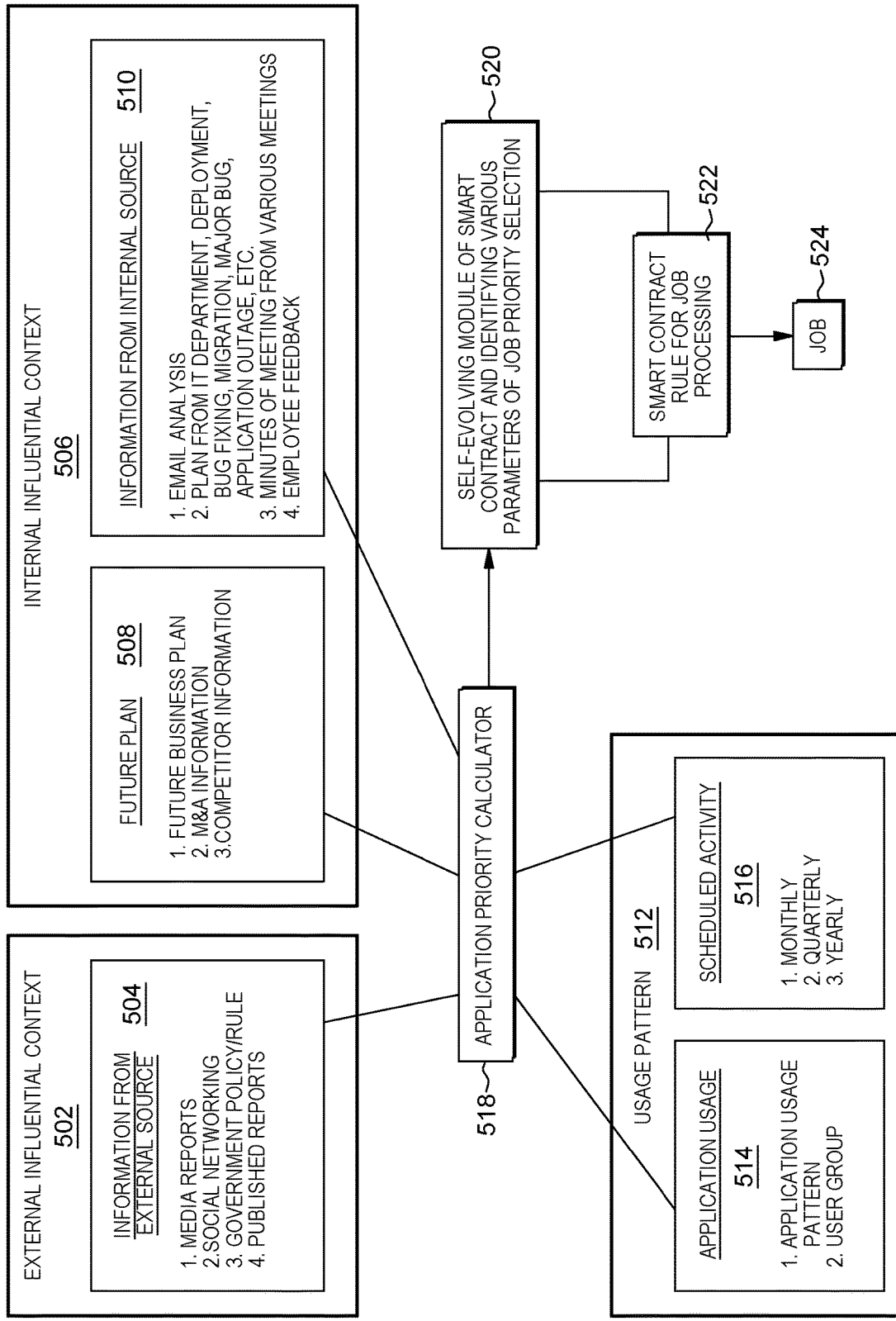
FIG. 5 is a block diagram view of a second embodiment a system according to the present invention.

As shown in FIG. 5, system 500 includes: external influential context block 502; information from external source block 504 which includes: 1. media reports, 2. social networking, 3. government policy/rule, 4. published reports; internal influential context block 506; future plan block 508 which includes: 1. future business plan, 2. M&A (mergers and acquisitions) information, 3. competitor information; information from internal source block 510 which includes: 1. email analysis, 2. plan from IT (information technology) department, deployment, bug fixing, migration, major bug, application outage, etc., 3. minutes of meeting from various meetings, 4. employee feedback; usage pattern block 512; application usage block 514 which includes: 1. application usage pattern, 2. user group; scheduled activity block 516 which includes: 1. monthly, 2. quarterly, 3. yearly; application priority calculator block 518; self-evolving module of smart contract and identifying various parameters of job priority selection block 520; smart contract rule for job processing block 522; and job block 524. System 500 predicts various changes in the contextual situation over time, and takes various responsive actions in response to changing context. System 500 intermittently performs auto-evolving operations on the smart contract rule. System 500 also reprioritizes the job processing to ensure the dynamic demand.

Some embodiments of the present invention may include one, or more, of the following operations, features, characteristics and/or advantages: (i) the system will be having an AI (artificial intelligence) module which will historically be gathering the various sources of information from different applications; (ii) the system will historically be gathering the information from various sources that includes: (a) an application usage log, (b) types of data analysis, and/or (c) types of filters used etc.; (iii) the system will also be gathering different types of external and internal influencing factors; (iv) the external and internal influencing factors are basically the factors which are driving the business users to analyze different applications; (v) the system will also be receiving the organization policies on application usage for different decision making; (vi) each and every application will also be having different types of metadata such as: (a) the types of data handled, (b) the volume of data handled, and/or (c) the types of decisions that are taken, etc.; and/or (vii) the system will also gather the feedback from the business.

Some embodiments of the present invention may include one, or more, of the following operations, features, characteristics and/or advantages: (i) the system will be performing machine learning on the gathered data to create a knowledge corpus to identify how the usage of applications are varied; (ii) based on the knowledge corpus, the system will be predicting: (a) why an application will be used, (b) what are the influencing factors, and/or (c) which factors are enabling the users to change the mode of analysis; (iii) the system will also analyze how the business users are analyzing the data along with any service request to support the team running any job etc.; (iv) based on the created knowledge corpus, the system will dynamically be evolving the smart contract; (v) the smart contract will be controlling the jobs to ensure the jobs are executed as per the SLA; (vi) the system will be using the knowledge corpus and the same will be used for self-evolving the smart contract rule for job execution; and/or (vii) while evolving the smart contract rule, the system will be identifying: (a) various changes in the contextual situation, (b) how the changes in the contextual situation are reprioritizing the applications, and/or (c) changes in the behavior and usage pattern of the applications.

Some embodiments of the present invention may include one, or more, of the following operations, features, characteristics and/or advantages: (i) based on historical learning, the system will be self-evolving the smart contract rule where the said smart contract rule will be controlling the job processing; (ii) the system will be evolving the smart contract rule based on: (a) the types of filters that are to be applied, and/or (b) the frequency of job processing, etc.; (iii) the system will be analyzing various sources of information and accordingly be predicting any change in the contextual situation; (iv) based on the change in the contextual situation, the system will be identifying appropriate smart contract rules for job processing; (v) the job execution engine will be receiving the smart contract rule and will be executing the jobs so that the business users can get the data in a timely fashion; and/or (vi) the SLA management system will be tracking: (a) the smart contract rule, (b) how the jobs are processed, and/or (c) the lowest priority jobs and datasets will be processed last.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a first version of a smart contract designed for use with a first SLA (service level agreement), the first version of the smart contract including a plurality of computing job control rules for performing job management in a computing environment governed by the first SLA;
receiving a plurality of computing jobs;
determining a first workflow for running and prioritizing the plurality of computing jobs;
starting to run the plurality of computing jobs in the computer environment according to the first workflow and the plurality of computing job control rules and governed by the first SLA;
after the plurality of computing jobs has begun to run, collecting context data, with the context data including operational information regarding the running and status of the plurality of computing jobs in the computing environment;
while at least some of the plurality of computing jobs are still running, dynamically determining a second workflow based on the context data;
after the dynamic determination of the second workflow, continuing to run the plurality of computing jobs in the computer environment according to the second workflow of the plurality of computing job control rules and governed by the first SLA;
training a machine learning algorithm using the set of context data as training data; and
applying the machine learning algorithm to the first version of the smart contract, with the application of the machine learning algorithm making at least a first change to the first job control rule and to thereby obtain a second version of the smart contract including a changed version of the first job control rule.

2. The CIM of claim 1 further comprising:
receiving requests for performance of a plurality of requested computing jobs to be performed under second version of smart contract and governed by the first SLA;
determining a contextual situation of the computer system that will be used to perform the plurality of requested computing jobs; and
applying the revised first job control rule of the second version of the smart contract to the contextual situation a prioritized order for performance of the plurality of requested computing jobs.

3. The CIM of claim 1 further comprising: performing the plurality of requested computing jobs in the prioritized order.

4. A computer program product (CPP) comprising: a set of non-transitory storage device(s); and computer code stored collectively in the set of storage device(s), with the computer code including data and instructions to cause a processor(s) set to perform at least the following operations:
receiving a first version of a smart contract designed for use with a first SLA (service level agreement), the first version of the smart contract including a plurality of computing job control rules for performing job management in a computing environment governed by the first SLA;
receiving a plurality of computing jobs;
determining a first workflow for running and prioritizing the plurality of computing jobs; starting to run the plurality of computing jobs in the computer environment according to the first workflow and the plurality of computing job control rules and governed by the first SLA;
after the plurality of computing jobs has begun to run, collecting context data, with the context data including operational information regarding the running and status of the plurality of computing jobs in the computing environment;
while at least some of the plurality of computing jobs are still running, dynamically determining a second workflow based on the context data;
after the dynamic determination of the second workflow, continuing to run the plurality of computing jobs in the computer environment according to the second workflow of the plurality of computing job control rules and governed by the first SLA;
training a machine learning algorithm using the set of context data as training data; and
applying the machine learning algorithm to the first version of the smart contract, with the application of the machine learning algorithm making at least a first change to the first job control rule and to thereby obtain a second version of the smart contract including a changed version of the first job control rule.

5. The CPP of claim 4 further comprising:
receiving requests for performance of a plurality of requested computing jobs to be performed under second version of smart contract and governed by the first SLA;
determining a contextual situation of the computer system that will be used to perform the plurality of requested computing jobs; and
applying the revised first job control rule of the second version of the smart contract to the contextual situation a prioritized order for performance of the plurality of requested computing jobs.

6. The CPP of claim 4 further comprising: performing the plurality of requested computing jobs in the prioritized order.

7. A computer system (CS) comprising:
a processor(s) set;
a set of storage device(s); and
computer code stored collectively in the set of storage device(s), with the computer code including data and instructions to cause the processor(s) set to perform at least the following operations:
receiving a first version of a smart contract designed for use with a first SLA (service level agreement), the first version of the smart contract including a plurality of computing job control rules for performing job management in a computing environment governed by the first SLA;

receiving a plurality of computing jobs;
determining a first workflow for running and prioritizing the plurality of computing jobs;
starting to run the plurality of computing jobs in the computer environment according to the first workflow and the plurality of computing job control rules and governed by the first SLA;
after the plurality of computing jobs has begun to run, collecting context data, with the context data including operational information regarding the running and status of the plurality of computing jobs in the computing environment;
while at least some of the plurality of computing jobs are still running, dynamically determining a second workflow based on the context data;
after the dynamic determination of the second workflow, continuing to run the plurality of computing jobs in the computer environment according to the second workflow of the plurality of computing job control rules and governed by the first SLA;
training a machine learning algorithm using the set of context data as training data; and
applying the machine learning algorithm to the first version of the smart contract, with the application of the machine learning algorithm making at least a first change to the first job control rule and to thereby obtain a second version of the smart contract including a changed version of the first job control rule.

8. The CS of claim 7 further comprising:
receiving requests for performance of a plurality of requested computing jobs to be performed under second version of smart contract and governed by the first SLA;
determining a contextual situation of the computer system that will be used to perform the plurality of requested computing jobs; and
applying the revised first job control rule of the second version of the smart contract to the contextual situation a prioritized order for performance of the plurality of requested computing jobs.

9. The CS of claim 8 further comprising: performing the plurality of requested computing jobs in the prioritized order.

* * * * *